Patented Feb. 18, 1930

1,747,771

UNITED STATES PATENT OFFICE

THEODORE WILLIAM GRUETTER, OF GRANTS PASS, OREGON

ART OF COMBUSTION

No Drawing. Application filed August 23, 1926. Serial No. 131,103.

This invention relates to the use, in combustion processes, of the more or less finely divided oxides of copper, nickel, and cobalt or mixture thereof as catalyzers for the combustion of combustible elements or compounds in presence of air or oxygen, and of initial heat to start the catalytic action, the said combustion being conducted in a suitable apparatus for the purpose of producing heat.

It has been known for many years that the catalytic power of accelerating combustion is possessed by the platinum-group metals. A standard test for platinum depends on what is called the "glow reaction". The glow reaction consists in absorbing a solution of the metal to be tested into a strip of asbestos, drying, and holding it in a gas flame until incandescent. The gas flame is then extinguished and the gas turned on again on the asbestos strip while it is still warm. Under these conditions it will glow with incandescence if platinum is present. While attempting to obtain the glow from a solution of copper ore which was supposed to carry platinum I discovered that copper itself, if in sufficient quantity, and when changed to copper oxide, will give the incandescent glow. This fact was theretofore unknown and my discovery thereof forms the subject of a government investigation, see The glow test for metals of the platinum group, by C. W. Davis, published in Journal of the Franklin Institute, May 1927, for the reason that assayers and others have depended on the glow reaction to prove the presence of platinum.

It has been known heretofore that the above metals and their oxides will catalyze oxidation reactions but the endeavor has always been to keep the temperature as low as possible in such processes, and to combine gases so as to produce a useful chemical compound. My purpose is to produce useful heat and an end product such as $CO_2$, $H_2O$, etc., which is of no further use i. e., by combustion as distinguished from slow or partial oxidation.

In order to find a more suitable supporting substance than asbestos I tried many substances and thereby discovered that when certain substances which are relatively difficultly combustible such, for example, as arc-light carbon, etc., are impregnated with certain solutions, such as copper solutions, and heated to incandescence, they will continue to burn, in air, until the carbon therein is all consumed. This they will not do without the presence of such catalyzer. This is a new discovery and heretofore unknown. This led to the addition of such catalyzers, in various forms, to liquid hydrocarbons, and measuring the amount of liquid required to be burned to produce a given amount of heat. I found that less fuel is necessary with such additions than without them to produce the same amount of heat. The natural conclusion from the above is that these catalytic substances, in presence of heat, take oxygen from air and pass it over to the combustible element or compound in a purified or concentrated form so that it will activate substances which cannot ordinarily be burned, and will accelerate the rate of combustion of ordinarily combustible elements or compounds.

When the said catalyzers are precipitated from solution into a porous supporting substance, such for example as diatomaceous earth, and changed to oxides by heat or otherwise, the surface area of the oxides is vastly greater than when the said oxides are otherwise formed. The degree of catalytic activation is thereby greatly increased. Catalytic combustion may be a form of so-called "flameless" or "surface combustion." What I call a catalyzer, for the purpose of catalytic combustion, may be defined as the more or less finely divided oxides of copper, or nickel, or cobalt, or mixtures thereof. For the purposes of this specification I also call the combination of such catalyzers with their supporting substance, a catalyzer. In the old process of surface combustion, which will be referred to in more detail below, any refractory substance has been called a catalyzer, or catalytic surface. There are important differences in the character of the catalytic action, as between the oxides of said metals on the one hand, and ordinary refractory surfaces on the other hand. These will be explained below.

What has been called surface combustion has been known for many years. It is based on the principle that when any more or less refractory substance, such as firebrick, porcelain, etc., is heated to incandescence by means of a gas flame, in the presence of air, and the flame then extinguished by momentarily interrupting the flow of gas, the surface of the refractory will maintain the incandescence without any ordinary flame as long as the gas, mixed with air, impinges on it at a sufficiently high velocity. The principal difference between such surfaces and the said oxides as catalyzers, is that the refractory must first be brought to incandescence by the flame, thereby absorbing a large amount of heat and requiring considerable time; whereas only a relatively low temperature, usually less than 300 degrees, centigrade, is necessary to start the reaction in the case of the said oxide catalyzers, and requires much less time. Furthermore, these oxides, at a certain critical temperature, become instantaneously incandescent and thereafter greatly accelerate the rate of combustion of the gas, the heat being concentrated at the surface of the oxides and radiated therefrom. The advantages of this low-temperature activation will be more fully explained in connection with a practical application. It will be evident that, because of this low temperature necessary to initiate the reaction, that the catalytic power of the said oxides is much greater than of ordinary refractory surfaces. Because of this greater power such substances, for example, as arc-light carbon, can be activated by said oxides as above described.

In the old surface combustion process granulated refractory, such as firebrick, has been placed in the fire tubes of steam boilers, and packed around crucibles for melting metals. Although high temperatures of flameless combustion have been attained, when treated as described, the incandescence did not spread throughout the mass of the refractory. For example, in the case of fire tubes filled with the granulated refractory only that portion of the refractory in the tube near the entrance became incandescent, while the portion farther back in the rear of the tube was warmed by the heat of the portion at the entrance, thus only acting as a baffle to absorb heat. On the other hand, when substances such as diatomaceous earth, which is of a highly porous nature, are impregnated with the said oxides and used in the same way the incandescence readily and quickly spreads throughout the length of a long fire tube. This is because of the relatively low temperature required to initiate the reaction with such oxides as catalyzers. It will therefore be readily seen that a much higher rate of average evaporation of steam per square foot per hour can be obtained with my catalyzers than by the old method. In other words, whereas in the old process a total steam evaporation of 100 pounds per hour was obtained by W. A. Bone with a 3′ x 3″ fire tube, seventy percent (70%) of the total evaporation was produced within 8 inches from the gas orifice. On the other hand, with my catalyzers, a total evaporation of much more than 100 pounds per hour may be obtained with a similar tube, the heat being distributed along the tube. A further advantage of my catalyzer is that much less time is required to raise the temperature and increase the rate of evaporation. Due to an even expansion and contraction of the tubes, where my catalyzers are used, other advantages are gained. The above advantages apply to heaters for cooking, general heating purposes, raising steam for power, melting and annealing metals, and in many other heat producing processes and apparatus.

The addition of such oxide catalyzers to coke, and other difficultly combustible solid fuels, for example, by soaking said coke, etc., before cooling, in a suitable solution of such metals or oxides, and precipitating therein or thereon the said oxides by heat, as in the course of use, or by other means, provides a fuel which will burn completely and readily with less air draft than is customary, the advantages of which will be obvious.

Their addition to liquid fuels has the same effect. This applies to the firing of oil-burning locomotives, marine boilers, etc. Where such liquid fuels are gasified the catalytic oxides may be used in a porous support, as described, and also injected with the gas if desired. For some purposes a catalyzer support, such as diatomaceous earth carrying copper oxides, etc., may be made to absorb the liquid fuel, the earth acting like a lamp wick. This is then lighted with a flame. After the surface becomes incandescent the flame is removed by shutting off air. Air is then quickly re-admitted. The surface will glow with incandescence as long as there is any liquid fuel left in the supporting substance. By supplying a continuous feed of liquid fuel this method may be used for ordinary heating purposes in a suitable apparatus.

These catalyzers may be used, in general, in any suitable form of heater, boiler, crucible or muffle furnace, fireplace, cooking stove, heating stove, etc., either as precipitations in porous substances which will burn, or in such as will not burn. In the latter case the combustible element would be a gas or a liquid. The porous supporting substance may be given any suitable shape or size, and applied in a suitable manner such as lumps in fire tubes or crucible furnaces, as bricks, blocks, cylinders, etc., in such manner that the catalytic glowing, or incandescent surfaces radiate their heat where it is useful. The catalyzers may be injected as solutions, or as powdered oxides or salts of said metals, or as metallic vapors, into gases, gaseous flames, hydrocarbon vapors, etc., before or after ignition of said fuels. In presence of air and heat these substances are changed into active oxides. They may be supported by a porous solid, or powder thereof, or suspended in liquids or gases before or during combustion. When these heated oxides are contacted with fuels mixed with or in presence of an oxygen-containing fluid they induce incandescent flameless catalytic combustion and intensify and enlarge the zone of radiation and said combustion. I do not wish to limit myself in any of these matters. When graphite, etc., is used as the support, as for example in fire tubes, or crucible furnaces, if the fuel component of the combustible gas mixture supplied is in excess of the quantity required to consume the oxygen content of the mixture, the carbon of the support will be but little attacked.

For the purpose of generic definition the metals copper, cobalt and nickel are embraced by the expression metals of the group having atomic numbers from 27 to 29.

I claim:

1. Process of producing heat for industrial and domestic uses which comprises subjecting fuel to incandescent catalytic combustion by bringing into contact fuel associated with a substance capable of forming a combustion catalyst, said catalyst comprising an oxide of at least one of the metals of the group having atomic numbers from 27 to 29, and a combustion-supporting agent, and heating said substance.

2. Process of producing heat for industrial and domestic uses which comprises subjecting fuel to incandescent catalytic combustion by bringing into contact fuel associated with a combustion catalyst comprising an oxide of at least one of the metals of the group having atomic numbers from 27 to 29, and a combustion-supporting agent, and heating said catalyst.

3. Process of producing heat for industrial and domestic uses which comprises subjecting fuel to incandescent catalytic combustion by bringing into contact fuel, a combustion catalyst comprising an oxide of at least one of the metals of the group having atomic numbers from 27 to 29, and a combustion-supporting agent, and heating said catalyst.

4. Process of producing heat for industrial and domestic uses which comprises subjecting fuel to incandescent catalytic combustion by bringing into contact fuel, a heated combustion catalyst comprising an oxide of at least one of the metals of the group having atomic numbers from 27 to 29, and a combustion-supporting agent.

5. Process of producing heat for industrial and domestic uses which comprises subjecting fuel to incandescent catalytic combustion by bringing into contact fuel, a combustion catalyst heated to a temperture of not less than about 300° C., said catalyst comprising an oxide of at least one of the metals of the group having atomic numbers from 27 to 29, and a combustion-supporting agent.

6. Process of producing heat for industrial and domestic uses which comprises subjecting fluid fuel to incandescent catalytic combustion by bringing into contact a fluid fuel, a heated oxide of copper, and a combustion supporting agent.

7. Process of producing heat for industrial and domestic uses which comprises subjecting liquid fuel to incandescent catalytic combustion by bringing into contact a liquid fuel, a heated oxide of copper, and a combustion supporting agent.

8. Process of producing heat for industrial and domestic uses which comprises subjecting fluid fuel to incandescent catalytic combustion by bringing into contact a fluid fuel, an oxide of copper heated to a temperature of not less than about 300° C., and a combustion supporting agent.

9. Process of producing heat for industrial and domestic uses which comprises subjecting liquid fuel to incandescent catalytic combustion by bringing into contact a liquid fuel, an oxide of copper heated to a temperature of not less than about 300° C., and a combustion supporting agent.

THEODORE WILLIAM GRUETTER.